United States Patent
Li et al.

(10) Patent No.: US 9,286,259 B2
(45) Date of Patent: Mar. 15, 2016

(54) METHOD AND APPARATUS FOR LOWERING I/O POWER OF A COMPUTER SYSTEM AND COMPUTER SYSTEM

(75) Inventors: Yu Li, Beijing (CN); Wen Bo Shen, Beijing (CN); Yan Qi Wang, Beijing (CN); Yudong Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 12/738,908

(22) PCT Filed: Oct. 10, 2008

(86) PCT No.: PCT/CN2008/072635
§ 371 (c)(1),
(2), (4) Date: Apr. 20, 2010

(87) PCT Pub. No.: WO2009/062435
PCT Pub. Date: May 22, 2009

(65) Prior Publication Data
US 2010/0211707 A1 Aug. 19, 2010

(30) Foreign Application Priority Data
Oct. 22, 2007 (CN) .......................... 2007 1 0166839

(51) Int. Cl.
*G06F 13/00* (2006.01)
*G06F 13/42* (2006.01)
*G06F 13/14* (2006.01)

(52) U.S. Cl.
CPC ............ *G06F 13/4286* (2013.01); *G06F 13/14* (2013.01); *G06F 13/42* (2013.01); *Y02B 60/1228* (2013.01); *Y02B 60/1235* (2013.01)

(58) Field of Classification Search
CPC .................................. G06F 13/14; G06F 13/42
USPC ....................................................... 710/52, 68
See application file for complete search history.

(56) References Cited

U.S. PATENT DOCUMENTS 5,402,123 A    3/1995 Jung
5,844,826 A   12/1998 Nguyen
(Continued)

FOREIGN PATENT DOCUMENTS

CN    2609301 Y    3/2004
JP    2001086106 A  3/2001
(Continued)

OTHER PUBLICATIONS

Jun Yang, et. al., "Frequent value encoding for low power data buses", ACM Transactions on Design Automation of Electronic Systems, vol. 9, No. 3, Jul. 2004, pp. 354-384.
(Continued)

*Primary Examiner* — Zachary K Huson
(74) *Attorney, Agent, or Firm* — Cantor Colburn LLP

(57) ABSTRACT

The present invention provides a method and an apparatus for lowering I/O power of a computer system and a computer system. According to an aspect of the present invention, there is provided a method for lowering I/O power of a computer system, comprising: buffering a plurality of ways of data to be sent to a bus; encoding each of the plurality of ways of data buffered from n bits to n+m bits based on an encoding rule, wherein n and m are both an integer larger than or equal to 1, the encoding rule is used to lower code switching frequency; and sending the plurality of ways of data encoded to the bus.

22 Claims, 7 Drawing Sheets

(56) References Cited

U.S. PATENT DOCUMENTS

| | | | |
|---|---|---|---|
| 7,259,699 B1 | 8/2007 | Xue | |
| 2004/0225945 A1* | 11/2004 | Poechmueller | 714/760 |
| 2007/0080721 A1 | 4/2007 | Yu | |
| 2007/0300121 A1* | 12/2007 | Cooper | 714/755 |

FOREIGN PATENT DOCUMENTS

| | | | |
|---|---|---|---|
| JP | 2002141808 A | 5/2002 | |
| JP | 2002202833 A | 7/2002 | |
| JP | 2002202947 A | 7/2002 | |
| JP | 2005025805 A | 1/2005 | |
| JP | 2007052714 A | 3/2007 | |
| JP | 2007257415 A | 10/2007 | |
| KR | 0162197 B1 | 12/1998 | |
| WO | 2006027742 A1 | 3/2006 | |
| WO | WO-2007059645 A1 | 5/2007 | |

OTHER PUBLICATIONS

M. Madhu, et. al., "Dynamic coding technique for low-power data bus", Proceedings of the IEEE Computer Society Annual Symposium on VLSI (ISVLSI'03).

Y. Aghaghiri, et. al., "Transition reduction in memory buses using sector-based encoding techniques", IEEE Trans. on Computer-Aided Design, vol. 23, No. 8, Aug. 2004, pp. 1164.

Rajeev Murgai, "Using complementation and resequencing to minimize transitions", Proceedings of 35th Design Automation Conference, 1998.

European Patent Office, Extended European Search Report, Application No. 08850030.1-1953; Patent No. PCT/CN2008072635; Reference: CN920070062EP1, Date Mailed: Dec. 5, 2014, pp. 1-5.

* cited by examiner

METHOD AND APPARATUS FOR LOWERING I/O POWER OF A COMPUTER SYSTEM AND COMPUTER SYSTEM

TECHNICAL FIELD

The present invention relates to computer technology, more particularly to technology of lowering I/O power of a computer system.

TECHNICAL BACKGROUND

In the field of computer design, a target which is sought continuously by people is to lower power from chip level to system level. With power consumption increased, cost for power supply and cooling of a system is increased in a higher speed.

Power of a computer system includes core power and I/O (Input/Output) power. At present, there are a lot of methods for lowering power of the computer system, for example:

Chip level: designing or selecting a low power chipsets;

System level: dynamically lowering operation voltage and operation frequency through DVFS (Dynamic Voltage and Frequency Scaling);

Compiler level: selecting lower power instructions;

OS (Operating System) level: disabling some function units when a system is not utilized through task scheduling;

Network level: switching to a waiting or suspended mode when NIC (Network Interface Card) doesn't work.

A specific example is a power management system of Intel DBS (Demand Based Switching), which has a logic for adjusting core power. It can adjust core voltage based on CPU's workload. The detailed description about Intel DBS can be seen in the Intel white paper: Addressing Power and Thermal Challenges in the Datacenter, www.intel.com/products/services/intelsolutionservices/success/techdocs/wp/thermal.pdf. However, the power management system of Intel DBS is mainly focused on the processor itself and doesn't lower I/O power effectively.

For example, it is reported in the article "Low Power Address Encoding using Self-Organizing Lists" written by Mahesh Mamidipaka, Dan Hirschberg and Nikil Dutt, Proceedings of the 2001 International Symposium on Low Power Electronics and Design (ISLPED '01), that, for the system optimized to low power, the proportion of I/O power and total power is between 10% and 80%, and generally 50%.

Thereby, it is required to lower I/O power of a computer system at the same time of lowering core power of the computer system.

A method for lowering I/O power of a computer system is disclosed in the article "Dynamic Coding Technique For Low-Power Data Bus" written by M. Madhu, V. Srinivasa and V. Kamakoti, Proceeding of the IEEE Computer Society Annual Symposium on VLSI, 2003, which is characterized in that, a code with a minimum hamming distance, which is calculated based on character distribution of the former data and the current data, is used to be transferred. Thus it can be seen that, this method is required to adopt a dynamic encoding scheme to encode data, and monitor and compare the former data and the current data in real time, so the spending is big, and the efficiency is low.

Thereby, there is required a method for lowering I/O power of a computer system effectively.

SUMMARY OF THE INVENTION

In order to solve the above-mentioned problems in the prior technology, the present invention provides a method and an apparatus for lowering I/O power of a computer system and a computer system.

According to an aspect of the present invention, there is provided a method for lowering I/O power of a computer system, comprising: buffering a plurality of ways of data to be sent to a bus; encoding each of the plurality of ways of data buffered from n bits to n+m bits based on an encoding rule, wherein n and m are both an integer larger than or equal to 1, the encoding rule is used to lower code switching frequency; and sending the plurality of ways of data encoded to the bus.

According to another aspect of the present invention, there is provided an apparatus for lowering I/O power of a computer system, comprising: an original data buffer configured to buffer a plurality of ways of data to be sent to a bus; an encoder configured to encode each of the plurality of ways of data buffered from n bits to n+m bits based on an encoding rule, wherein n and m are both an integer larger than or equal to 1, the encoding rule is used to lower code switching frequency; and an encoded data buffer configured to buffer the plurality of ways of data encoded in order to send them to the bus.

According to another aspect of the present invention, there is provided a computer system, comprising: a CPU; an I/O device; a bus configured to transfer data between CPU and I/O device; and the above-mentioned apparatus for lowering I/O power of a computer system.

BRIEF DESCRIPTION OF THE DRAWINGS

It is believed that through the following detailed description of the embodiments of the present invention, taken in conjunction with the drawings, the above-mentioned features, advantages, and objectives will be better understood, wherein.

DETAILED DESCRIPTION OF THE INVENTION

In order to understand the following embodiments readily, several factors of affecting I/O power of a computer system will be simply introduced firstly. It is well known that I/O power is determined by the following formula (I):

$$P_{I/O} = C_L \cdot N_{SW} \cdot V_{DD}^2 \cdot f \tag{1}$$

wherein $C_L$ denotes equivalent capacitance, $N_{SW}$ denotes the ratio of switching action to system clock, namely switching frequency, $V_{DD}$ denotes operation voltage, f denotes operation frequency. That is to say, I/O power is in proportion to square of operation voltage $V_{DD}$, and is in proportion to switching frequency $N_{SW}$. The present invention will make efforts to lower I/O power through lowering switching frequency. Specifically, since system clock holds constant generally, the present invention will lower I/O power through lowering switching action.

Figure 1:
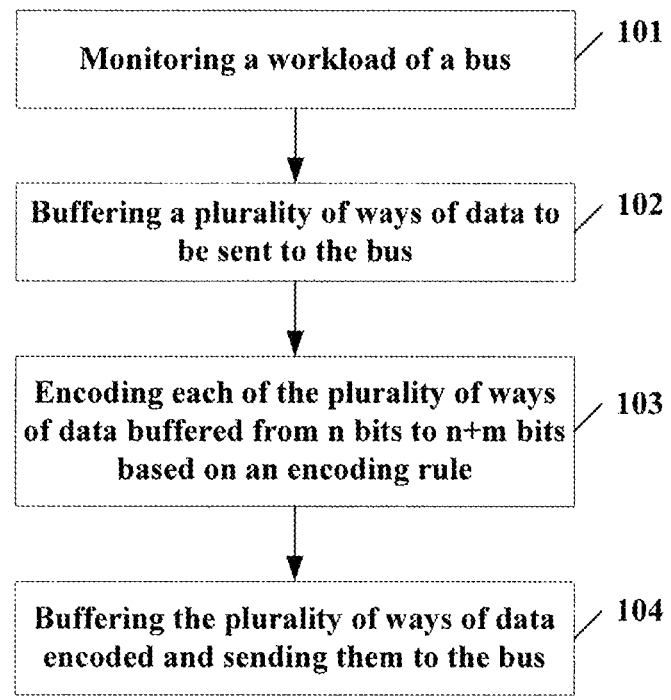
FIG. 1 is a flowchart showing a method for lowering I/O power of a computer system according to an embodiment of the present invention.

FIG. 1 is a flowchart showing a method for lowering I/O power of a computer system according to an embodiment of the present invention. Before describing the embodiment of the method of FIG. 1, the principle of lowering I/O power through lowering switching frequency through temporarily encoding data to be sent to a bus is explained in conjunction with FIG. 2 and Table 1.

Figure 2:
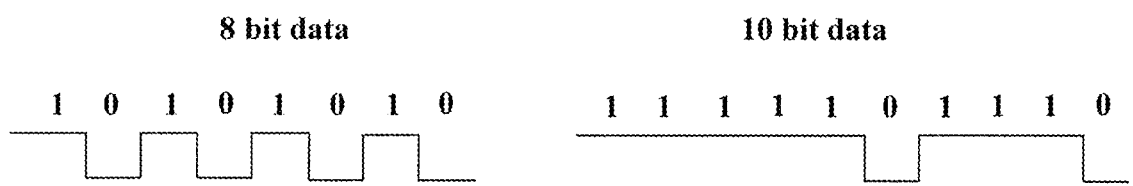
FIG. 2 is a contrastive figure showing switching times of 8 bit data and 10 bit data according to the embodiment of the present invention.

FIG. 2 is a contrastive figure of switching times showing the times of switching action of 8 bit data and 10 bit data according to the embodiment of the present invention. As shown in FIG. 2, for an 8 bit data 10101010, its switching times is 7, and for a 10 bit data 1111101110 corresponding to the 8 bit data, its switching times is 3. Thereby, if the 8 bit data is encoded to the 10 bit data, the maximum switching times is lowered from 7 to 3, and switching frequency is lowered, and I/O power is lowered consequently. The following Table 1 shows a code book mapping an 8 bit data space with a 10 bit data space and the switching times.

TABLE 1

| 8 Bit Code | Switching times | 10 Bit Code | Switching times |
|---|---|---|---|
| 00000000 | 0 | 0000000000 | 0 |
| 11111111 | 0 | 1111111111 | 0 |
| 00000001 | 1 | 0000000001 | 1 |
| 00000011 | 1 | 0000000011 | 1 |
| 00000111 | 1 | 0000000111 | 1 |
| 00001111 | 1 | 0000001111 | 1 |
| 00011111 | 1 | 0000011111 | 1 |
| 00111111 | 1 | 0000111111 | 1 |
| 01111111 | 1 | 0001111111 | 1 |
| 10000000 | 1 | 0011111111 | 1 |
| 11000000 | 1 | 0111111111 | 1 |
| 11100000 | 1 | 1000000000 | 1 |
| 11110000 | 1 | 1100000000 | 1 |
| 11111000 | 1 | 1110000000 | 1 |
| 11111100 | 1 | 1111000000 | 1 |
| 11111110 | 1 | 1111100000 | 1 |
| 00000010 | 2 | 1111110000 | 1 |
| 00000100 | 2 | 1111111000 | 1 |
| 00000110 | 2 | 1111111100 | 1 |
| 00001000 | 2 | 1111111110 | 1 |
| 00001100 | 2 | 0000000010 | 2 |
| 00001110 | 2 | 0000000100 | 2 |
| 00010000 | 2 | 0000000110 | 2 |
| 00011000 | 2 | 0000001000 | 2 |
| 00011100 | 2 | 0000001100 | 2 |
| 00011110 | 2 | 0000001110 | 2 |
| 00100000 | 2 | 0000010000 | 2 |
| 00110000 | 2 | 0000011000 | 2 |
| 00111000 | 2 | 0000011100 | 2 |
| 00111100 | 2 | 0000011110 | 2 |
| 00111110 | 2 | 0000100000 | 2 |
| 01000000 | 2 | 0000110000 | 2 |
| 01100000 | 2 | 0000111000 | 2 |
| 01110000 | 2 | 0000111100 | 2 |
| 01111000 | 2 | 0000111110 | 2 |
| 01111100 | 2 | 0001000000 | 2 |
| 01111110 | 2 | 0001100000 | 2 |
| 10000001 | 2 | 0001110000 | 2 |
| 10000011 | 2 | 0001111000 | 2 |
| 10000111 | 2 | 0001111100 | 2 |
| 10001111 | 2 | 0001111110 | 2 |
| 10011111 | 2 | 0010000000 | 2 |
| 10111111 | 2 | 0011000000 | 2 |
| 11000001 | 2 | 0011100000 | 2 |
| 11000011 | 2 | 0011110000 | 2 |
| 11000111 | 2 | 0011111000 | 2 |
| 11001111 | 2 | 0011111100 | 2 |
| 11011111 | 2 | 0011111110 | 2 |

TABLE 1-continued

| 8 Bit Code | Switching times | 10 Bit Code | Switching times |
|---|---|---|---|
| 11100001 | 2 | 0100000000 | 2 |
| 11100011 | 2 | 0110000000 | 2 |
| 11100111 | 2 | 0111000000 | 2 |
| 11101111 | 2 | 0111100000 | 2 |
| 11110001 | 2 | 0111110000 | 2 |
| 11110011 | 2 | 0111111000 | 2 |
| 11110111 | 2 | 0111111100 | 2 |
| 11111001 | 2 | 0111111110 | 2 |
| 11111011 | 2 | 1000000001 | 2 |
| 11111101 | 2 | 1000000011 | 2 |
| 00000101 | 3 | 1000000111 | 2 |
| 00001001 | 3 | 1000001111 | 2 |
| 00001011 | 3 | 1000011111 | 2 |
| 00001101 | 3 | 1000111111 | 2 |
| 00010001 | 3 | 1001111111 | 2 |
| 00010011 | 3 | 1011111111 | 2 |
| 00010111 | 3 | 1100000001 | 2 |
| 00011001 | 3 | 1100000011 | 2 |
| 00011011 | 3 | 1100000111 | 2 |
| 00011101 | 3 | 1100001111 | 2 |
| 00100001 | 3 | 1100011111 | 2 |
| 00100011 | 3 | 1100111111 | 2 |
| 00100111 | 3 | 1101111111 | 2 |
| 00101111 | 3 | 1110000001 | 2 |
| 00110001 | 3 | 1110000011 | 2 |
| 00110011 | 3 | 1110000111 | 2 |
| 00110111 | 3 | 1110001111 | 2 |
| 00111001 | 3 | 1110011111 | 2 |
| 00111011 | 3 | 1110111111 | 2 |
| 00111101 | 3 | 1111000000 | 2 |
| 01000001 | 3 | 1111000011 | 2 |
| 01000011 | 3 | 1111000111 | 2 |
| 01000111 | 3 | 1111001111 | 2 |
| 01001111 | 3 | 1111011111 | 2 |
| 01011111 | 3 | 1111100001 | 2 |
| 01100001 | 3 | 1111100011 | 2 |
| 01100011 | 3 | 1111100111 | 2 |
| 01100111 | 3 | 1111101111 | 2 |
| 01101111 | 3 | 1111110001 | 2 |
| 01110001 | 3 | 1111110011 | 2 |
| 01110011 | 3 | 1111110111 | 2 |
| 01110111 | 3 | 1111111001 | 2 |
| 01111001 | 3 | 1111111011 | 2 |
| 01111011 | 3 | 1111111101 | 2 |
| 01111101 | 3 | 0000000101 | 3 |
| 10000010 | 3 | 0000001001 | 3 |
| 10000100 | 3 | 0000001011 | 3 |
| 10000110 | 3 | 0000001101 | 3 |
| 10001000 | 3 | 0000010001 | 3 |
| 10001100 | 3 | 0000010011 | 3 |
| 10001110 | 3 | 0000010111 | 3 |
| 10010000 | 3 | 0000011001 | 3 |
| 10011000 | 3 | 0000011011 | 3 |
| 10011100 | 3 | 0000011101 | 3 |
| 10011110 | 3 | 0000100001 | 3 |
| 10100000 | 3 | 0000100011 | 3 |
| 10110000 | 3 | 0000100111 | 3 |
| 10111000 | 3 | 0000101111 | 3 |
| 10111100 | 3 | 0000110001 | 3 |
| 10111110 | 3 | 0000110011 | 3 |
| 11000010 | 3 | 0000110111 | 3 |
| 11000100 | 3 | 0000111001 | 3 |
| 11000110 | 3 | 0000111011 | 3 |
| 11001000 | 3 | 0000111101 | 3 |
| 11001100 | 3 | 0001000001 | 3 |
| 11001110 | 3 | 0001000011 | 3 |
| 11010000 | 3 | 0001000111 | 3 |
| 11011000 | 3 | 0001001111 | 3 |
| 11011100 | 3 | 0001011111 | 3 |
| 11011110 | 3 | 0001100001 | 3 |
| 11100010 | 3 | 0001100011 | 3 |
| 11100100 | 3 | 0001100111 | 3 |
| 11100110 | 3 | 0001101111 | 3 |
| 11101000 | 3 | 0001110001 | 3 |
| 11101100 | 3 | 0001110011 | 3 |
| 11101110 | 3 | 0001110111 | 3 |
| 11110010 | 3 | 0001111001 | 3 |

TABLE 1-continued

| 8 Bit Code | Switching times | 10 Bit Code | Switching times |
|---|---|---|---|
| 11110100 | 3 | 0001111011 | 3 |
| 11110110 | 3 | 0001111101 | 3 |
| 11111010 | 3 | 0010000001 | 3 |
| 00001010 | 4 | 0010000011 | 3 |
| 00010010 | 4 | 0010000111 | 3 |
| 00010100 | 4 | 0010001111 | 3 |
| 00010110 | 4 | 0010011111 | 3 |
| 00011010 | 4 | 0010111111 | 3 |
| 00100010 | 4 | 0011000001 | 3 |
| 00100100 | 4 | 0011000011 | 3 |
| 00100110 | 4 | 0011000111 | 3 |
| 00101000 | 4 | 0011001111 | 3 |
| 00101100 | 4 | 0011011111 | 3 |
| 00101110 | 4 | 0011100001 | 3 |
| 00110010 | 4 | 0011100011 | 3 |
| 00110100 | 4 | 0011100111 | 3 |
| 00110110 | 4 | 0011101111 | 3 |
| 00111010 | 4 | 0011110001 | 3 |
| 01000010 | 4 | 0011110011 | 3 |
| 01000100 | 4 | 0011110111 | 3 |
| 01000110 | 4 | 0011111001 | 3 |
| 01001000 | 4 | 0011111011 | 3 |
| 01001100 | 4 | 0011111101 | 3 |
| 01001110 | 4 | 0100000001 | 3 |
| 01010000 | 4 | 0100000011 | 3 |
| 01011000 | 4 | 0100000111 | 3 |
| 01011100 | 4 | 0100001111 | 3 |
| 01011110 | 4 | 0100011111 | 3 |
| 01100010 | 4 | 0100111111 | 3 |
| 01100100 | 4 | 0101111111 | 3 |
| 01100110 | 4 | 0110000001 | 3 |
| 01101000 | 4 | 0110000011 | 3 |
| 01101100 | 4 | 0110000111 | 3 |
| 01101110 | 4 | 0110001111 | 3 |
| 01110010 | 4 | 0110011111 | 3 |
| 01110100 | 4 | 0110111111 | 3 |
| 01110110 | 4 | 0111000001 | 3 |
| 01111010 | 4 | 0111000011 | 3 |
| 10000101 | 4 | 0111000111 | 3 |
| 10001001 | 4 | 0111001111 | 3 |
| 10001011 | 4 | 0111011111 | 3 |
| 10001101 | 4 | 0111100001 | 3 |
| 10010001 | 4 | 0111100011 | 3 |
| 10010011 | 4 | 0111100111 | 3 |
| 10010111 | 4 | 0111101111 | 3 |
| 10011001 | 4 | 0111110001 | 3 |
| 10011011 | 4 | 0111110011 | 3 |
| 10011101 | 4 | 0111110111 | 3 |
| 10100001 | 4 | 0111111001 | 3 |
| 10100011 | 4 | 0111111011 | 3 |
| 10100111 | 4 | 0111111101 | 3 |
| 10101111 | 4 | 1000000010 | 3 |
| 10110001 | 4 | 1000000100 | 3 |
| 10110011 | 4 | 1000000110 | 3 |
| 10110111 | 4 | 1000001000 | 3 |
| 10111001 | 4 | 1000001100 | 3 |
| 10111011 | 4 | 1000001110 | 3 |
| 10111101 | 4 | 1000010000 | 3 |
| 11000101 | 4 | 1000011000 | 3 |
| 11001001 | 4 | 1000011100 | 3 |
| 11001011 | 4 | 1000011110 | 3 |
| 11001101 | 4 | 1000100000 | 3 |
| 11010001 | 4 | 1000110000 | 3 |
| 11010011 | 4 | 1000111000 | 3 |
| 11010111 | 4 | 1000111100 | 3 |
| 11011001 | 4 | 1000111110 | 3 |
| 11011011 | 4 | 1001000000 | 3 |
| 11011101 | 4 | 1001100000 | 3 |
| 11100101 | 4 | 1001110000 | 3 |
| 11101001 | 4 | 1001111000 | 3 |
| 11101011 | 4 | 1001111100 | 3 |
| 11101101 | 4 | 1001111110 | 3 |
| 11110101 | 4 | 1010000000 | 3 |
| 00010101 | 5 | 1011000000 | 3 |
| 00100101 | 5 | 1011100000 | 3 |
| 00101001 | 5 | 1011110000 | 3 |
| 00101011 | 5 | 1011111000 | 3 |
| 00101101 | 5 | 1011111100 | 3 |
| 00110101 | 5 | 1011111110 | 3 |
| 01000101 | 5 | 1100000010 | 3 |
| 01001001 | 5 | 1100000100 | 3 |
| 01001011 | 5 | 1100000110 | 3 |
| 01001101 | 5 | 1100001000 | 3 |
| 01010001 | 5 | 1100001100 | 3 |
| 01010011 | 5 | 1100001110 | 3 |
| 01010111 | 5 | 1100010000 | 3 |
| 01011001 | 5 | 1100011000 | 3 |
| 01011011 | 5 | 1100011100 | 3 |
| 01011101 | 5 | 1100011110 | 3 |
| 01100101 | 5 | 1100100000 | 3 |
| 01101001 | 5 | 1100110000 | 3 |
| 01101011 | 5 | 1100111000 | 3 |
| 01101101 | 5 | 1100111100 | 3 |
| 01110101 | 5 | 1100111110 | 3 |
| 10001010 | 5 | 1101000000 | 3 |
| 10010010 | 5 | 1101100000 | 3 |
| 10010100 | 5 | 1101110000 | 3 |
| 10010110 | 5 | 1101111000 | 3 |
| 10011010 | 5 | 1101111100 | 3 |
| 10100010 | 5 | 1101111110 | 3 |
| 10100100 | 5 | 1110000010 | 3 |
| 10100110 | 5 | 1110000100 | 3 |
| 10101000 | 5 | 1110000110 | 3 |
| 10101100 | 5 | 1110001000 | 3 |
| 10101110 | 5 | 1110001100 | 3 |
| 10110010 | 5 | 1110001110 | 3 |
| 10110100 | 5 | 1110010000 | 3 |
| 10110110 | 5 | 1110011000 | 3 |
| 10111010 | 5 | 1110011100 | 3 |
| 11001010 | 5 | 1110011110 | 3 |
| 11010010 | 5 | 1110100000 | 3 |
| 11010100 | 5 | 1110110000 | 3 |
| 11010110 | 5 | 1110111000 | 3 |
| 11011010 | 5 | 1110111100 | 3 |
| 11101010 | 5 | 1110111110 | 3 |
| 00101010 | 6 | 1111000010 | 3 |
| 01001010 | 6 | 1111000100 | 3 |
| 01010010 | 6 | 1111000110 | 3 |
| 01010100 | 6 | 1111001000 | 3 |
| 01010110 | 6 | 1111001100 | 3 |
| 01011010 | 6 | 1111001110 | 3 |
| 01101010 | 6 | 1111010000 | 3 |
| 10010101 | 6 | 1111011000 | 3 |
| 10100101 | 6 | 1111011100 | 3 |
| 10101001 | 6 | 1111011110 | 3 |
| 10101011 | 6 | 1111100010 | 3 |
| 10101101 | 6 | 1111100100 | 3 |
| 10110101 | 6 | 1111100110 | 3 |
| 11010101 | 6 | 1111101000 | 3 |
| 01010101 | 7 | 1111101100 | 3 |
| 10101010 | 7 | 1111101110 | 3 |
| Total switching times | 896 | | 654 |

The generating rule and flow of the code book of Table 1 are described in detail as follows.

(1) All codes of a code space (8 bits) to be transformed are sorted by the switching times;

(2) All codes of a target code space (10 bits) are sorted by the switching times;

(3) Two sorted code books are mapped one by one, the mapping principle is:

(3.1) Codes with high switching times are mapped with codes with high switching times, and codes with low switching times are mapped with codes with low switching times;

(3.2) Switching rate can't be increased after the 8 bit data space is transformed into the 10 bit data space, that is to say, the total switching times of the 8 bits (896 in Table 1) must be larger than or equal to the total switching times of the 10 bits mapped (654 in Table 1);

(3.3) Any corresponding relation can exist between codes with identical switching times, for example, an 8 bit code with 6 switching times (such as 11010101) can be transformed into any one of the 10 bit codes with 3 switching times correspondingly.

It is calculated from Table 1 that the total switching times of the 8 bit data space is 896. However, this number 896 is only used to statistically denote power performance gain in an average meaning, and it is possible to become higher or lower when an input data collection is provided with other characters. The total switching times of the 10 bit data space is 654, and this number is the optimum value of the 10 bit data space, because codes with the switching times less than or equal to 2 are all included in this code book, and a part of the 10 bit codes with the switching times equal to 3 are included in Table 1. In addition, there are also some codes not included in Table 1 (i.e. not be used), but it is impossible to lower this total switching times 654 continuously. Thereby, if the 8 bit data are encoded to the 10 bit data, the total switching times can be lowered from 896 to 654, and I/O power can be lowered 27% consequently. In addition, due to a certain spending of the implementation of the present invention, I/O power can be lowered about 20% if the spending is deducted.

Further, it should be understood for those skilled in the art that, although an encoding rule of the present invention is explained taking the transformation from the 8 bit data space into the 10 bit data space as an example hereinbefore, the encoding rule of Table 1 doesn't make up of the unique encoding rule from the 8 bit data space to the 10 bit data space, and it is just one of the embodiments. Under the condition of assuring to lower the total switching times here to 654, other encoding rules can be also selected, for example, other codes with the switching times equal to 3 are used to be mapped with the codes of the 8 bit data space. Further, any n bits can be also encoded to n+m bits based on the above-mentioned encoding rule, wherein n and m are both an integer larger than or equal to 1, and I/O power of a computer system is lowered through lowering switching frequency consequently.

Next, a detailed description of each embodiment of the present invention will be given in conjunction with the accompany drawings.

Method for Lowering I/O Power of a Computer System

FIG. 1 is a flowchart showing a method for lowering I/O power of a computer system according to an embodiment of the present invention. As shown in FIG. 1, first at Step 101, optionally, a workload of a bus of the computer system is monitored. Specifically, a bus monitor or any module or technology as known by those skilled in the art can be used to monitor the workload of the bus, for example, the data queuing situation in a register is read continuously through an operating system of a computer, thereby, information related to the working situation of the bus is obtained to monitor the workload of the bus. Further, the workload of the bus is obtained instantly when data are required to be transferred between a CPU and an I/O device, and the present invention has no limitation to this, if only the workload of the bus can be obtained when needed. It can be understood that, the I/O device mentioned herein includes but not limits to: a display device, a system memory such as a read-only memory and a random access memory etc, a hard disk, a CD-ROM, an input device such as a mouse and a keyboard etc, a network device such as a router etc, and other devices as known in the art or developed in the future, and the present invention has no limitation to the I/O device, and any device inputted/outputted with CPU through the bus can be the I/O device herein. It should be understood that, the above-mentioned step of monitoring the workload of the bus is only an optional step of the embodiment, the purpose of which is to balance the relation between efficiency of inputting/outputting data with the bus and I/O power better, and the bus can also not be monitored in this embodiment, and the following step is performed directly.

Next, at Step 102, a plurality of ways of data to be sent to the bus are buffered. In this embodiment, the plurality of ways of data to be sent to the bus can be buffered by using any memory of the computer system, for example, a shift register is used to buffer the data, and the present invention has no limitation to this.

Next, at Step 103, each of the plurality of ways of data buffered at Step 102 are encoded from n bits to n+m bits based on an encoding rule, wherein n and m are both an integer larger than or equal to 1. The encoding rule herein is namely the above-mentioned encoding rule described in conjunction with FIG. 2 and Table 1, which is used to lower code switching frequency.

Next, a detailed description of the encoding process of the embodiment will be given in conjunction with FIG. 3 and FIG. 4 taking n=8, m=2 as an example.

Figure 3:
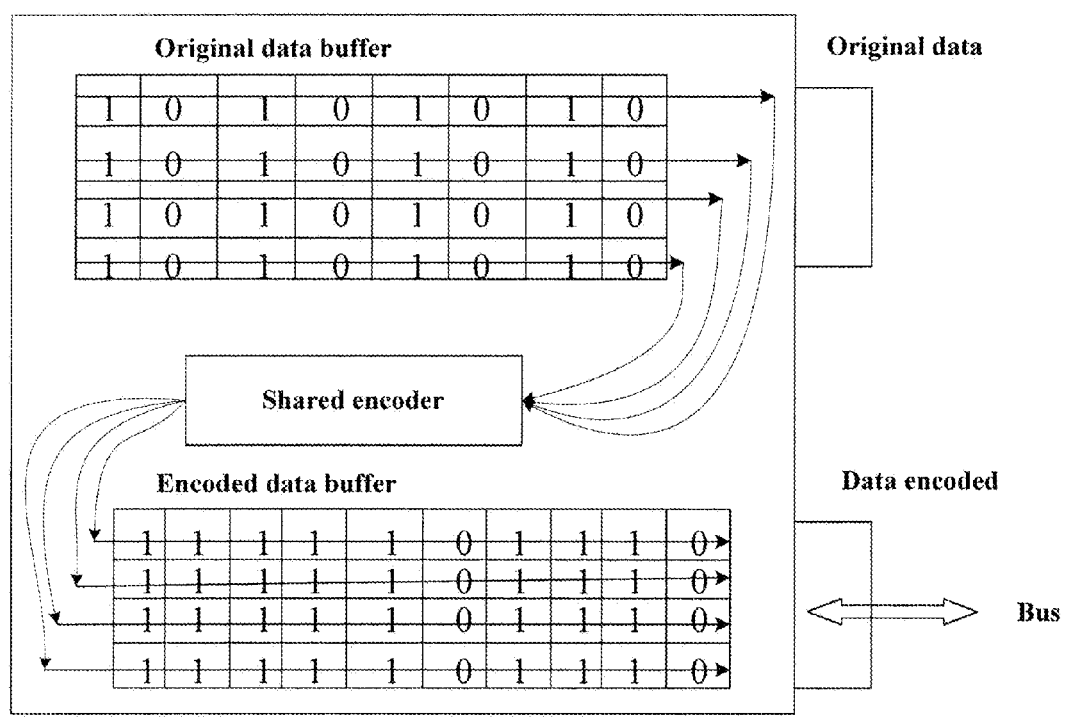
FIG. 3 is an example showing encoding data from n bits to n+m bits according to the embodiment of the present invention.

FIG. 3 is an example showing encoding data from 8 bits to 10 bits according to the embodiment of the present invention. As shown in FIG. 3, when the bus is not busy, the 4 ways of data to be sent to the bus are buffered in an original data buffer in a format of 8 bits per each way, and then the plurality of ways of 8 bit data are encoded to 10 bit data respectively by using a shared encoder for the 4 ways of data, and the 10 bit data encoded are buffered in an encoded data buffer. Specifically, the plurality of ways of the 8 bit data can be encoded to the 10 bit data corresponding to it by the shared encoder by using the code book pre-stored as shown in Table 1. It should be understood that, although the 4 ways of data are shown as an example herein, the present invention is not limited to this, and the present invention can be changed based on a specific application.

Figure 4:
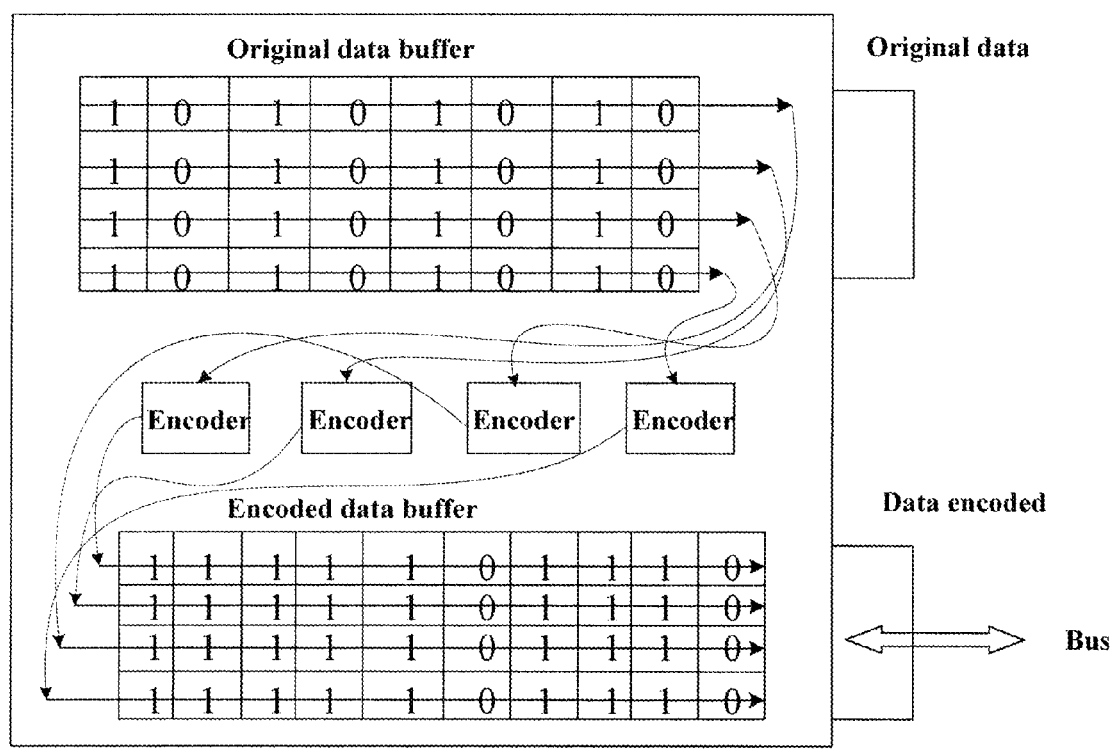
FIG. 4 is another example showing encoding data from n bits to n+m bits according to the embodiment of the present invention.

FIG. 4 is another example showing encoding data from 8 bits to 10 bits according to the embodiment of the present invention. In this embodiment, the plurality of ways of data are provided with their own encoders, and the encoding process is same with the above-mentioned example of FIG. 3, which is appropriately omitted herein. It should be understood that, although the example herein shows that each of the plurality of ways of data is provided with a respective encoder, the present invention is not limited to this, and the present invention can provide any encoder for any plurality of ways of data based on a practical need, if only each of the plurality of ways of the 8 bit data can be encoded to the 10 bit data.

Further, it should be understood that, although the encoding rule of the present invention is described based on encoding 8 bits to 10 bits herein, the present invention is not limited to this, and the present invention can encode any n bit data to n+m data, if only switching frequency can be lowered based on the above-mentioned encoding rule.

In this embodiment, optionally, a threshold can be defined at the step of encoding the plurality of ways of data buffered of Step 103, and this threshold can be the workload monitored at Step 101, for example, this threshold is defined as 0.6, that is to say, the bus is defined busy when the workload of the bus is larger than or equal to 60%, and the bus is defined not busy when the workload of the bus is less than 60%. It should be understood that, this threshold 0.6 is just an example, the threshold of busy and not busy of the bus can be defined as any value between 0 and 1 based on a practical instance, and the present invention has no limitation to the threshold definition.

That is to say, when it is monitored that the workload of the bus is below the above-mentioned threshold such as 0.6, the bus is namely not busy, the plurality of ways of data to be sent to the bus buffered are encoded from n bits to n+m bits, and the present invention has no limitation to this.

Further, in this embodiment, the workload of the bus can be defined as some ranges such as 80-100%, 60-80%, 40-60%, 20-40%, 0-20%, and different encoding rules are selected for different levels of the workload respectively. For example, if the workload of the bus is monitored in 80-100% at Step 101, the encoding rule from 8 bits to 10 bits is selected; if the workload of the bus is monitored in 60-80% at Step 101, the encoding rule from 8 bits to 12 bits is selected; if the workload of the bus is monitored in 40-60% at Step 101, the encoding rule from 8 bits to 14 bits is selected; if the workload of the bus is monitored in 20-40% at Step 101, the encoding rule from 8 bits to 16 bits is selected; if the workload of the bus is monitored in 0-20% at Step 101, the encoding rule from 8 bits to 18 bits is selected. It should be understood that, the above-mentioned ranges of the workload and the corresponding encoding rules are just examples, and the present invention can define any range of the workload and the corresponding encoding rule based on the practical need.

At last, at Step 104, the plurality of ways of data encoded are buffered, data buffered are sent to the bus, and data encoded are sent to the CPU or the I/O device through the bus. In this embodiment, the plurality of ways of data to be sent to the bus can be buffered by using any memory of the computer system, for example, the shift register is used for buffering, and the present invention has no limitation to this.

Further, before the above-mentioned encoding at Step 103, in the method of the embodiment, the encoding rule can also be sent to a CPU side I/O controller and/or an I/O device side I/O controller when it is monitored that the workload of the bus is below a threshold at Step 101. The corresponding encoder is controlled to perform encoding at Step 103 by the CPU side I/O controller and/or the I/O device side I/O controller based on the encoding rule received.

Further, before the n+m bit data encoded from the bus are sent to the CPU or the I/O device, the method of the embodiment further comprises a step of decoding the n+m bit data encoded into n bit data based on the above-mentioned encoding rule, and the decoding process is opposite to the above-mentioned encoding process, that is to say, firstly, the plurality of ways of the n+m bit data encoded from the bus are buffered; next, the n+m bit data buffered are decoded into the n bit data based on the above-mentioned encoding rule; next, the plurality of ways of the n bit data decoded are buffered; at last, the n bit data buffered are sent to the CPU or the I/O device.

Further, in this embodiment, the above-mentioned encoding/decoding can be implemented through hardware such as an IC etc. Specifically, the encoder/decoder can be integrated into the computer system directly, or the encoder/decoder can also be integrated into I/O controller of the computer system. Further, the encoding/decoding can also be implemented through software. So-called implementation through software means that data are outputted after being encoded/decoded through a software program when data is to be outputted by the CPU. The present invention has no limitation to this, if only the encoding/decoding can be performed between the n bit data and the n+m bit data.

It is emphasized again that, in this embodiment, although the workload of the bus is monitored at Step 101 before the encoding at Step 103, the monitoring process at Step 101 is optional, the purpose of which is to balance the relation between efficiency of inputting/outputting data and I/O power. The bus can also not be monitored, the plurality of ways of data to be sent to the bus are buffered directly, and then the encoding is performed.

Through the method for lowering I/O power of a computer system of the embodiment, I/O power can be lowered effectively based on the workload level of the bus of the computer system. Thereby, the energy consumption is saved infinitely. An 8-10 bit encoding/decoding system is implemented in a simulation system by the inventor of the present invention. Specifically, a hardware design of the encoder/decoder is completed by the inventor. Next, data are simulated to be inputted randomly in the simulation system, and the encoder/decoder power and I/O power caused by outputting data under an un-coded status are calculated (both simulation processes), and power caused by the encoding/decoding circuit added is about 5% of I/O power, and the specific value has relation with a simulation software, system input/output, an encoder/decoder design and so on. Thereby, a net gain larger than 20% can be obtained finally compared with I/O power lowered of 27% obtained through the above-mentioned encoding.

Apparatus for Lowering I/O Power of a Computer System

Figure 5:
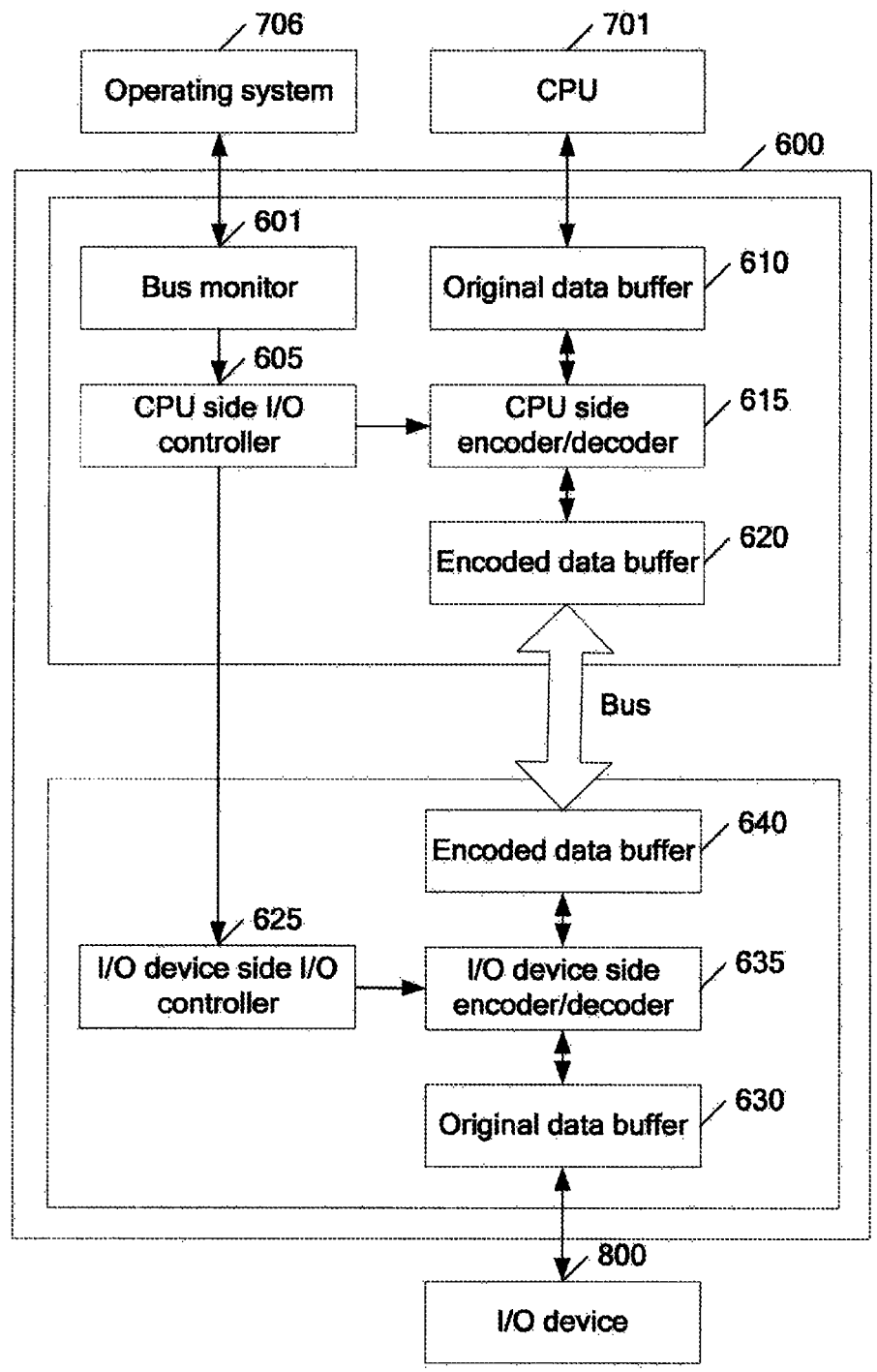
FIG. 5 is a block diagram showing an apparatus for lowering I/O power of a computer system according to another embodiment of the present invention.

Under the same inventive conception, FIG. 5 is a block diagram showing an apparatus for lowering I/O power of a computer system according to another embodiment of the present invention. Next, the present embodiment will be described in conjunction with FIG. 5. For those same parts as the above embodiment, the description of which will be appropriately omitted.

As shown in FIG. 5, the apparatus 600 for lowering I/O power of a computer system of the embodiment comprises a bus monitor 601 configured to monitor a workload of the bus of the computer system. Specifically, any module or technology as known by those skilled in the art can be used as the bus monitor 601 to monitor the workload of the bus, for example, the data queuing situation in a register is read continuously through an operating system of a computer, thereby, information related to the working situation of the bus is obtained to monitor the workload of the bus. Further, the workload of the bus is obtained by the bus monitor 601 instantly when data are required to be transferred between a CPU 701 and an I/O device 800, and the present invention has no limitation to this, if only the workload of the bus can be obtained when needed. It is mentioned by the way that, the bus monitor 601 configured to monitor the workload of the bus is only an optional unit of the apparatus 600 of this embodiment, the purpose of which is to balance the relation between efficiency of inputting/outputting data with the bus and the I/O power better, and the bus can also not be monitored in this embodiment, that is to say, the apparatus 600 doesn't comprise the bus monitor 601.

In this embodiment, the I/O device 800 includes but not limits to: a display device, a system memory such as a read-only memory and a random access memory etc, a hard disk, a CD-ROM, an input device such as a mouse and a keyboard etc, a network device such as a router etc, and other devices as known in the art or developed in the future, and the present invention has no limitation to the I/O device, and any device inputted/outputted with CPU 701 through the bus can be the I/O device 800 herein.

The apparatus 600 for lowering I/O power of a computer system of the embodiment also comprises an original data buffer 610 and/or 630 configured to buffer a plurality of ways of data to be sent to a bus. In this embodiment, the original data buffer 610 and/or 630 can be any memory of the computer system such as a shift register, and the present invention has no limitation to this.

Further, through messaging an encoding rule from n bits to n+m bits to a CPU side encoder/decoder 615 and/or an I/O device side encoder/decoder 635, encoding from n bits to n+m bits is performed by the apparatus 600 for lowering I/O power of a computer system of the embodiment, wherein n and m are both an integer larger than or equal to 1. Further, the encoding rule from n bits to n+m bits can also be messaged to a CPU side I/O controller 605 and/or an I/O device side I/O controller 625. After the encoding rule is received, data buffered in the original data buffer 610 and/or 630 are encoded from n bits to n+m bits by the corresponding encoder/decoder 615 and/or 635, which is controlled by the CPU side I/O controller 605 and/or the I/O device side I/O controller 625. The encoding rule described herein is namely the above-mentioned encoding rule described in conjunction with FIG. 2 and Table 1, which is used to lower code switching frequency.

In this embodiment, optionally, a threshold can be defined for the encoder/decoder 615 and/or 635, which determines whether to encode the plurality of ways of data buffered or not, and this threshold can be the workload of the bus monitored by the bus monitor 601, for example, this threshold is defined as 0.6, that is to say, the bus is defined busy when the workload of the bus is larger than or equal to 60%, and the bus is defined not busy when the workload of the bus is less than 60%. It should be understood that, this threshold 0.6 is just an example, the threshold of busy and not busy of the bus can be defined as any value between 0 and 1 (namely larger than or equal to 0, and less than or equal to 1) based on a practical instance, and the present invention has no limitation to the threshold definition.

The encoding process of the encoder/decoder 615 and/or 635 of the embodiment is similar with that of the above-mentioned embodiment described in conjunction with FIG. 3 and FIG. 4, and the description of which is appropriately omitted herein.

After the encoding is performed by the encoder/decoder 615 and/or 635, the plurality of ways of data encoded are buffered in an encoded data buffer 620 and/or 640. Then, data buffered in the encoded data buffer 620 and/or 640 are sent to the bus, and data encoded are sent to CPU 701 or I/O device 800 through the bus.

Before the n+m bit data encoded from the bus are sent to CPU 701 or I/O device 800, the n+m bit data encoded are decoded into n bit data by the encoder/decoder 615 and/or 635 of the embodiment based on the above-mentioned encoding rule, and the decoding process is opposite to the encoding process described in conjunction with FIG. 3 and FIG. 4 in the above-mentioned embodiment, that is to say, firstly, the plurality of ways of the n+m bit data encoded from the bus are buffered by using the encoded data buffer 620 and/or 640; next, the n+m bit data buffered are decoded into the n bit data based on the above-mentioned encoding rule; next, the plurality of ways of the n bit data decoded are buffered in the original data buffer 610 and/or 630; at last, the n bit data buffered are sent to CPU 701 or I/O device 800.

Optionally, in this embodiment, the workload of the bus can be defined as some ranges such as 80-100%, 60-80%, 40-60%, 20-40%, 0-20%, and different encoding rules are selected for different levels of the workload respectively. For example, if the workload of the bus is monitored in 80-100% by the bus monitor 601, the encoding rule from 8 bits to 10 bits is selected; if the workload of the bus is monitored in 60-80% by the bus monitor 601, the encoding rule from 8 bits to 12 bits is selected; if the workload of the bus is monitored in 40-60% by the bus monitor 601, the encoding rule from 8 bits to 14 bits is selected; if the workload of the bus is monitored in 20-40% by the bus monitor 601, the encoding rule from 8 bits to 16 bits is selected; if the workload of the bus is monitored in 0-20% by the bus monitor 601, the encoding rule from 8 bits to 18 bits is selected. It should be understood that, the above-mentioned ranges of the workload and the corresponding encoding rules are just examples, and the present invention can define any range of the workload and the corresponding encoding rule based on a practical need.

Further, in this embodiment, the above-mentioned encoder/decoder 615 and/or 635 can be implemented through hardware such as an IC etc. Specifically, the encoder/decoder 615 and/or 635 can be integrated into the computer system directly, or the encoder/decoder 615 and/or 635 can also be integrated into I/O controller of the computer system. Further, the encoder/decoder 615 and/or 635 can also be implemented through software. So-called implementation through a software means that data are outputted after being encoded/decoded through a software program when data is to be outputted by the CPU. The present invention has no limitation to this, if only the encoding/decoding can be performed between the n bit data and the n+m bit data.

It should be understood that, in this embodiment, although the workload of the bus is monitored by the bus monitor 601 before the encoding is performed by the encoder/decoder 615 and/or 635, the bus monitor 601 is optional, the purpose of which is to balance the relation between efficiency of inputting/outputting data and I/O power, and the plurality of ways of data to be sent to the bus can also be buffered directly, and then the encoding is performed.

Next, a more detailed description of a hardware structure of the apparatus 600 for lowering I/O power of a computer system of the embodiment and the implementation process will be given in conjunction with FIG. 6.

Figure 6:
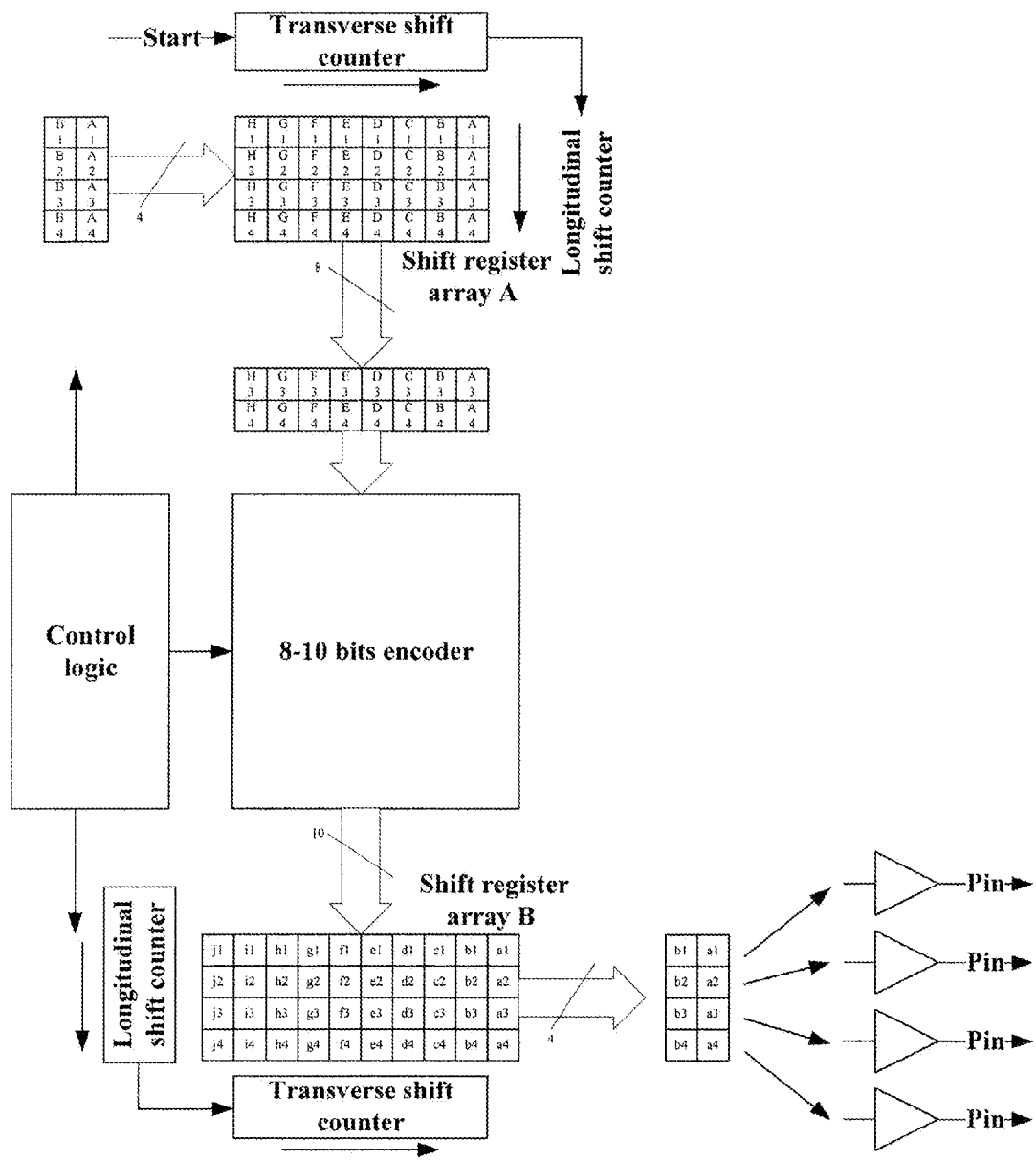
FIG. 6 is a sketch map showing a hardware structure of the apparatus for lowering I/O power of a computer system according to the embodiment of the present invention.

As shown in FIG. 6, an actual hardware circuit mainly includes 4 modules: a shift register array A, an 8-10 bit encoder, a shift register array B and a control logic. The 4 ways of data shown in FIG. 3 and FIG. 4 are taken as an example herein, the shift register array A is an 8×4 shift register matrix, and the shift register array B is a 10×4 shift register matrix. Each shift register can shift data rightwards or downwards, and the specific operation is controlled by the control logic and a shift counter.

Firstly, data (8 bits) sent from the CPU is controlled to be shifted rightwards by a transverse shift counter of the shift register array A. When the transverse shift counter counts 8 data, data are controlled to be shifted out downwards by a longitudinal shift counter, and data outputted is data to be encoded. Then, data to be encoded received are transformed into codes of 10 bits and outputted to the shift register array B by the 8-10 bit encoder, and data are controlled to be shifted downwards in turn by a longitudinal shift counter. When the longitudinal shift counter counts 4 data, data are controlled to be shifted out rightwards in turn by a transverse shift counter, and data shifted out are transferred to pins and sent to the bus.

The hardware structure used for decoding is similar with the hardware structure of the encoding, it is just that, firstly, the 10 bit data to be decoded are buffered by using a 10×4 shift register matrix, then, data to be decoded are decoded into the 8 bit data, and then, data decoded are shifted and buffered in an 8×4 shift register matrix and outputted.

It should be understood that, the hardware structure shown in FIG. 6 is just an example of the apparatus 600 for lowering I/O power of a computer system of the embodiment, and the present invention is not limited to this, and the apparatus 600 for lowering I/O power of a computer system of the embodiment can be implemented through any combination of the hardware structure as known in the art or developed in the future, if only the plurality of ways of data can be encoded/decoded between n bits and n+m bits through the apparatus 600, thereby, switching frequency is lowered effectively, and I/O power is lowered moreover.

Through the apparatus 600 for lowering I/O power of a computer system of the embodiment, I/O power can be lowered effectively based on the workload level of the bus of the computer system. Thereby, the energy consumption is saved infinitely. For example, it is calculated through an 8-10 bit encoding/decoding system, which is implemented in an simulation system by the inventor of the present invention that, power caused by an encoding/decoding circuit added is about 5% of I/O power, and a net gain larger than 20% can be obtained finally compared with I/O power lowered of 27% obtained through the above-mentioned encoding.

Computer System

Figure 7:
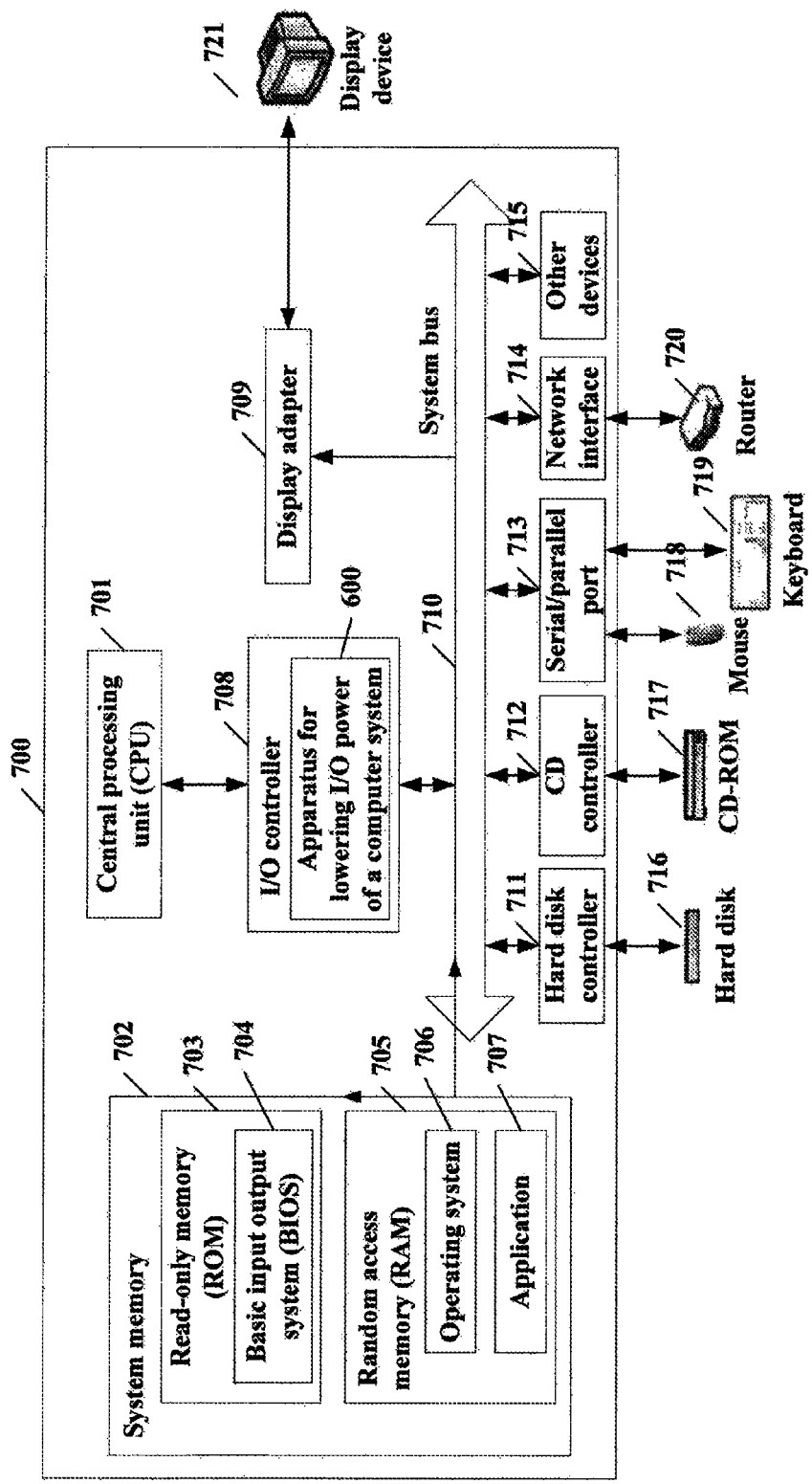
FIG. 7 is a block diagram showing a computer system according to another embodiment of the present invention.

Under the same inventive conception, FIG. 7 is a block diagram showing a computer system according to another embodiment of the present invention. Next, the present embodiment will be described in conjunction with FIG. 7. For those same parts as the above embodiments, the description of which will be appropriately omitted.

As shown in FIG. 7, the computer system 700 of the embodiment comprises: a central processing unit (CPU) 701; an I/O controller 708; a system bus 710 configured to transfer data between CPU 701 and an I/O device; and an I/O device connected with CPU 701 through the I/O controller 708 and the system bus 710, the I/O device includes but not limits to: a display device 721 connected through a display adapter 709, a system memory 702, a hard disk 716 connected through a hard disk controller 711, a CD-ROM 717 connected through a CD controller 712, an input device such as a mouse 718 and a keyboard 719 etc. connected through a serial/parallel port 713, a network device such as a router 720 etc. connected through a network interface 714, and other devices 715 as known in the art or developed in the future. The I/O controller 708 includes the above-mentioned apparatus 600 for lowering I/O power of a computer system configured to lower I/O power of the computer system 700 when the workload of the system bus 710 is below a threshold. The system memory 702 includes a read-only memory (ROM) 703 and a random access memory (RAM) 705. The read-only memory 703 includes a basic input output system (BIOS) 704 of a computer. The random access memory 705 includes an operating system 706 loaded and an application 707.

Through the computer system 700 of the embodiment, I/O power can be lowered effectively based on the workload level of the bus of the computer system 700. Thereby, the energy consumption is saved effectively. For example, it is calculated through an 8-10 bit encoding/decoding system, which is implemented in an simulation system by the inventor of the present invention that, power caused by an encoding/decoding circuit added is about 5% of I/O power, and a net gain larger than 20% can be obtained finally compared with I/O power lowered of 27% obtained through the above-mentioned encoding.

Although a method and an apparatus for lowering I/O power of a computer system and a computer system have been described in details with some exemplary embodiments, these above embodiments are not exhaustive. Those skilled in the art can make various variations and modifications within the spirit and the scope of the present invention. Therefore, the present invention is not limited to these embodiments; rather, the scope of the present invention is only defined by the appended claims.

The invention claimed is:

1. A method for lowering I/O power of a computer system, comprising:
   buffering a plurality of ways of data to be sent to a bus;
   encoding each of said plurality of ways of data buffered from n bits to n+m bits based on an encoding rule, wherein n and m are both integers larger than or equal to 1, and wherein said encoding rule is used to lower code switching frequency;
   wherein said encoding rule comprises a code book mapping an n bit data space with an n+m bit data space, in which all codes of said n bit data space are mapped with codes of said n+m bit data space one by one; and
   sending said plurality of ways of data encoded to said bus.

2. The method according to claim 1, further comprising: monitoring a workload of said bus of said computer system before said encoding, and encoding each of said plurality of ways of data buffered when it is monitored that the workload of said bus is below a threshold.

3. The method according to claim 1, further comprising: decoding said n+m bit data encoded into n bit data based on said encoding rule after receiving said n+m bit data encoded from said bus.

4. The method according to claim 3, wherein said encoding and said decoding are implemented through hardware.

5. The method according to claim 3, wherein said encoding and said decoding are implemented through software.

6. The method according to claim 2, wherein said monitoring the workload of said bus comprises: obtaining the workload of said bus instantly when data are required to be transferred between a CPU and an I/O device.

7. The method according to claim 2, further comprising: selecting a corresponding encoding rule based on said workload of said bus monitored.

8. The method according to claim 3, wherein said each of said plurality of ways of data and said decoding are performed through respective encoders and decoders.

9. The method according to claim 3, wherein said encoding and said decoding are performed through a shared encoder/decoder.

10. The method according to claim 1, wherein switching times of each of all codes of said n bit data space is larger than or equal to switching times of a code of said n+m bit data space mapped with said code.

11. An apparatus for lowering I/O power of a computer system, comprising:
    an original data buffer configured to buffer a plurality of ways of data to be sent to a bus;
    an encoder configured to encode each of said plurality of ways of data buffered from n bits to n+m bits based on an encoding rule, wherein n and m are both in larger than or equal to 1, and wherein said encoding rule is used to lower code switching frequency;
    wherein said encoding rule comprises a code book mapping an n bit data space with an n+m bit data space, in which all codes of said n bit data space are mapped with codes of said n+m bit data space one by one; and
    an encoded data buffer configured to buffer said plurality of ways of data encoded in order to send them to said bus.

12. The apparatus according to claim 11, further comprising: a bus monitor configured to monitor a workload of said bus of said computer system, and each of said plurality of ways of data buffered are encoded by said encoder when it is monitored that the workload of said bus is below a threshold.

13. The apparatus according to claim 11, further comprising: a decoder configured to decode said n+m bit data encoded into n bit data based on said encoding rule after receiving said n+m bit data encoded from said bus.

14. The apparatus according to claim 13, wherein said encoder and said decoder are implemented through hardware.

15. The apparatus according to claim 13, wherein said encoder and said decoder are implemented through software.

16. The apparatus according to claim 12, wherein the workload of said bus is obtained instantly by said bus monitor when data are required to be transferred between a CPU and an I/O device.

17. The apparatus according to claim 12, wherein a corresponding encoding rule is selected by said bus monitor based on said workload of said bus monitored.

18. The apparatus according to claim 13, wherein said encoder comprises a plurality of encoders/decoders configured to encode and decode each of said plurality of ways of data respectively.

19. The apparatus according to claim 13, wherein said encoder and said decoder are shared by said plurality of ways of data.

20. The apparatus according to claim 11, wherein switching times of each of all codes of said n bit data space is larger than or equal to switching times of a code of said n+m bit data space mapped with said code.

21. The apparatus according to claim 11, wherein said original data buffer and said encoded data buffer are implemented through a shift register and a shift counter.

22. A computer system, comprising:
a CPU;
an I/O device;
a bus configured to transfer data between said CPU and said I/O device;
an original data buffer configured to buffer a plurality of ways of data to be sent to the bus;
an encoder configured to encode each of said plurality of ways of data buffered from n bits to n+m bits based on an encoding rule, wherein n and m are both integers larger than or equal to 1, and wherein said encoding rule is used to lower code switching frequency;
wherein said encoding rule comprises a code book mapping an n bit data space with an n+m bit data space, in which all codes of said n bit data space are mapped with codes of said n+m bit data space one by one; and
an encoded data buffer configured to buffer said plurality of ways of data encoded in order to send them to said bus.

* * * * *